United States Patent
Blass

(10) Patent No.: US 10,354,316 B2
(45) Date of Patent: Jul. 16, 2019

(54) ITEM LIST DISPLAY

(71) Applicant: Walmart Apollo, LLC, Bentonville, AR (US)

(72) Inventor: Oscar John Blass, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 446 days.

(21) Appl. No.: 15/080,628

(22) Filed: Mar. 25, 2016

(65) Prior Publication Data
US 2016/0292775 A1 Oct. 6, 2016

Related U.S. Application Data

(60) Provisional application No. 62/142,145, filed on Apr. 2, 2015.

(51) Int. Cl.
  G06Q 30/00 (2012.01)
  G06Q 30/06 (2012.01)
(52) U.S. Cl.
  CPC ..... *G06Q 30/0639* (2013.01); *G06Q 30/0633* (2013.01)
(58) Field of Classification Search
  CPC .................. G06Q 30/0633; G06Q 30/0639
  USPC .............................................. 705/26.8, 26.9
  See application file for complete search history.

(56) References Cited

U.S. PATENT DOCUMENTS

| | | | |
|---|---|---|---|
| 7,308,356 B2 * | 12/2007 | Melaku ................ | G01C 21/206 379/88.01 |
| 8,401,915 B1 | 3/2013 | Kim | |
| 8,749,389 B2 | 6/2014 | Kamen | |
| 8,847,754 B2 | 9/2014 | Buchheim et al. | |
| 10,157,403 B1 * | 12/2018 | Fuzell-Casey ......... | G06Q 30/02 |
| 2005/0256781 A1 | 11/2005 | Sands et al. | |
| 2009/0096628 A1 | 4/2009 | Moscovitch | |

(Continued)

OTHER PUBLICATIONS

A. Asthana, M. Cravatts and P. Krzyzanowski, "An indoor wireless system for personalized shopping assistance," Workshop on Mobile Computing Systems and Applications, Santa Cruz, CA, USA, 1994, pp. 69-74; extracted on Google Search.*

(Continued)

*Primary Examiner* — Yogesh C Garg
(74) *Attorney, Agent, or Firm* — Schmeiser, Olsen & Watts LLP

(57) ABSTRACT

Provided are a system and method for displaying an item list, comprising: a list generator on a device that associates a list of items of interest at a retail establishment with feedback data according to locations of the items of interest relative to a location of the device; a location server that determines the locations of the items of interest relative to the location of the device; and an updater that reorders the list of items of interest and associates the feedback data with the reordered list of according to current locations of the items of interest relative to the location of the device. When the device is at a closest item of interest having a predetermined feedback data, the closest item of interest is swiped or removed from the list of items of interest displayed at the user interface, and the list of items of interest is reordered so that the next closest item of interest has the predetermined feedback data.

12 Claims, 4 Drawing Sheets

(56) References Cited

U.S. PATENT DOCUMENTS

| | | | |
|---|---|---|---|
| 2010/0106662 A1* | 4/2010 | Ramaswamy | G01C 21/20 |
| | | | 705/323 |
| 2010/0131377 A1* | 5/2010 | Karnalkar | G06Q 30/0207 |
| | | | 705/26.1 |
| 2013/0191741 A1 | 7/2013 | Dickinson et al. | |
| 2013/0207791 A1 | 8/2013 | Olsson et al. | |
| 2013/0218456 A1 | 8/2013 | Zelek et al. | |
| 2013/0311329 A1 | 11/2013 | Knudson et al. | |
| 2014/0058886 A1 | 2/2014 | Gopalakrishnan | |
| 2014/0195372 A1 | 7/2014 | Bassemir et al. | |
| 2015/0161715 A1* | 6/2015 | Rose | G06Q 30/0639 |
| | | | 705/26.8 |
| 2016/0171004 A1* | 6/2016 | Zhang | G06F 16/5838 |
| | | | 382/106 |
| 2018/0108073 A1* | 4/2018 | Borom | G06Q 30/02 |

OTHER PUBLICATIONS 2005-603882, Aug. 2005, Derwent, WHITE D F.*
"LocationList", Shiftedfrequency.net, Shiftedfrequency, 2013, first accessed Jan. 13, 2015, most recently accessed Mar. 24, 2016; 6 pages.
"Bytelight(TM) Services: Indoor Positioning", AcuityBrands.com, Acuity Brands, first accessed Jan. 13, 2015, most recently accessed Mar. 24, 2016; 3 pages.

* cited by examiner

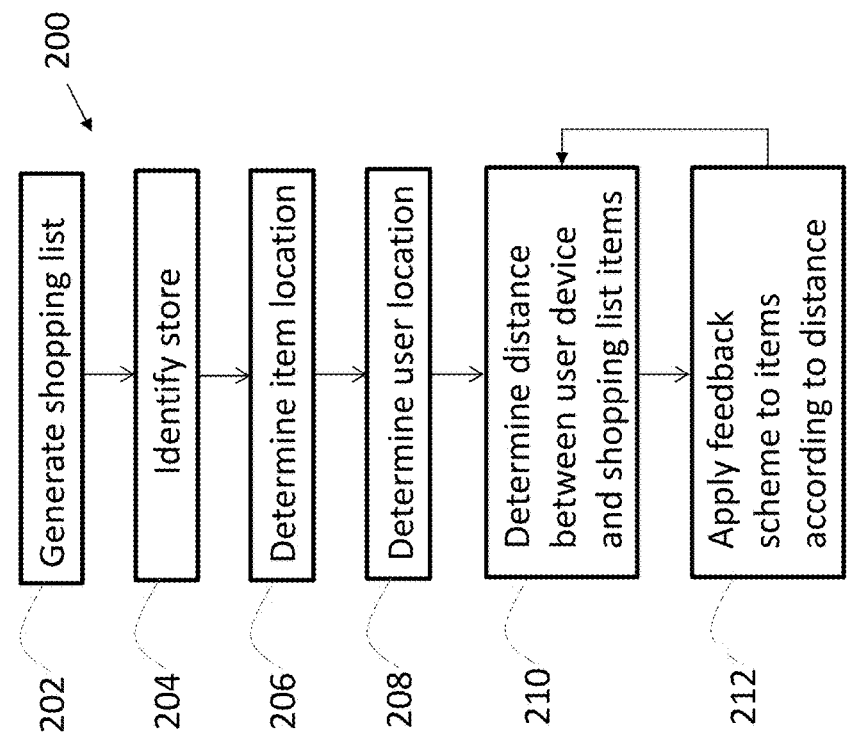

ITEM LIST DISPLAY

RELATED APPLICATION

This application claims priority to U.S. Provisional Application Ser. No. 62/142,145, filed on Apr. 2, 2015 entitled "Item List Display", the entirety of which is incorporated by reference herein.

FIELD

The present concepts relate generally to item locators, and more specifically, to a device and method for locating and displaying a list of items of interest.

BACKGROUND

Retail establishments typically stock many store items that may be of interest to a shopper. The items are organized according to type or brand of product, and located along aisles so that a shopper can view them for possible purchase.

BRIEF SUMMARY

In one aspect, provided is a system for displaying an item list, comprising: a list generator on a device that associates a list of items of interest at a retail establishment with feedback data according to locations of the items of interest relative to a location of the device; a location server that determines the locations of the items of interest relative to the location of the device; and an updater that reorders the list of items of interest and associates the feedback data with the reordered list of according to current locations of the items of interest relative to the location of the device, wherein when the device is at a closest item of interest having a predetermined feedback data, the closest item of interest is swiped or removed from the list of items of interest displayed at the user interface, and the list of items of interest is reordered so that the next closest item of interest has the predetermined feedback data.

In some embodiments, the distance between the device and the items of interest is determined by a combination of a global positioning satellite (GPS) device on the device and a radio frequency identification (RFID) signal received from the items of interest.

In some embodiments, the feedback data includes a color scheme that is displayed to indicate a current distance between the device and the item of interest.

In some embodiments, the color scheme includes a first color that is displayed when the device is at a first distance from the item of interest and a second color that is displayed when the device is at a second distance from the item of interest.

In some embodiments, the predetermined feedback data includes a first color of the color scheme, and wherein the next closest item of interest changes from a second color to the first color.

In some embodiments, the color scheme includes a plurality of colors, each corresponding to an item, and each indicative of a distance of the item from the device.

In some embodiments, the feedback data includes a tactile feedback scheme.

In some embodiments, the tactile feedback scheme includes a first device vibration when the device is at a first distance from the item of interest and a second device vibration when the device is at a second distance from the item of interest.

In some embodiments, the device further comprises a store map that displays at the user interface a turn-by-turn display for locating the closest item of interest.

In some embodiments, each item of interest is identified among the list of items based on a distance of the device from the items of interest, wherein the user interface displays a particular item of interest based on the particular item of interest being the closest to the device among the list of items of interest.

In some embodiments, the feedback data includes at least one of color, audio, acoustic, or tactile feedback data.

In some embodiments, the device is stationary and the items of interest are in motion relative to the device.

In some embodiments, the items of interest are stationary and the device is in motion relative to the items of interest.

In another aspect, provided is a system for displaying a list of items of interest, comprising a location server that determines at least one of a distance and a direction from the items of interest and an updater at a mobile shopper device that applies a feedback scheme to displayed shopping list that lists the items of interest according to the distance between a device and the items of interest.

In some embodiments, the feedback scheme includes at least one of color, audio, acoustic, or tactile feedback data.

In some embodiments, the color feedback data includes a plurality of colors, each corresponding to an item, and each indicative of a distance of the item from the device.

In some embodiments, the system further comprises a list generator that associates the feedback scheme with the items of interest according to a location of the items relative to the location of the device.

In some embodiments, the device is stationary and the items of interest are in motion relative to the device.

In some embodiments, the items of interest are stationary and the device is in motion relative to the items of interest.

In another aspect, provided is a method for displaying a list of items of interest, comprising: determining a distance between a device displaying a shopping list and the items of interest on the shopping list; and applying a feedback scheme to the displayed shopping list according to the distance between a device displaying the shopping list and the items of interest.

BRIEF DESCRIPTION OF THE SEVERAL VIEWS OF THE DRAWINGS

The above and further advantages may be better understood by referring to the following description in conjunction with the accompanying drawings, in which like numerals indicate like structural elements and features in various figures. The drawings are not necessarily to scale, emphasis instead being placed upon illustrating the principles of the FIG. 1 is block diagram of an environment for locating and displaying a shopping list, in accordance with some embodiment.

FIG. 4 is a flowchart of a method for identifying a list of items of interest based on locations of the items, in accordance with some embodiments.

DETAILED DESCRIPTION

There is a need for a system and method that improves a shopping experience, especially in large retail stores having much floor space and carrying many different items.

Figure 1:
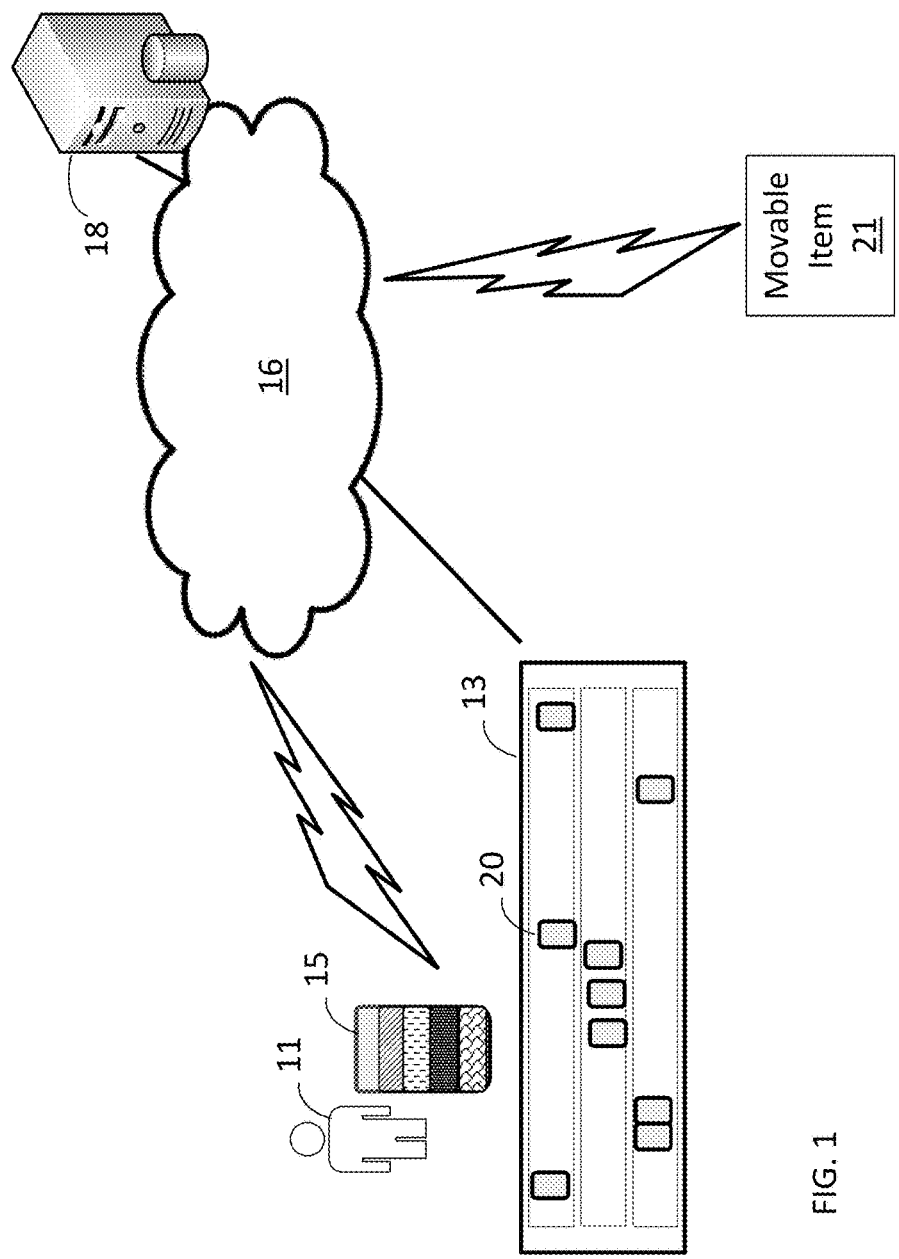

FIG. 1 is block diagram of an environment 10 for locating and displaying a shopping list, in accordance with some embodiment.

The environment 10 includes a retail store including a plurality of shelves 13 or the like on which a plurality of items 20 are located, and stationary. A user 11 such as a customer in possession of a mobile electronic device, referred to as a shopper device 15, can physically retrieve one or more products directly from the shelves 13. The shopper device 15 can be a personal digital assistant (PDA), smartphone, or other electronic device comprising a display and processor for displaying an arrangement of items of interest according to a proximity of the device 15 from the items of interest. In other embodiments, the device 15 is not in direct possession by the customer due to its size or configuration, but is nevertheless mobile, or stationary relative to the items of interest which change location relative to the device. In particular, the mobile electronic device 15 may display items of interest such as a shopping list which changes according to the location of the items of interest relative to the mobile electronic device 15. In other embodiments, an item 21 of interest is movable, for example, and transit, and the customer 11, or other user, is stationary. For example, the user 11 may be a manager at a superstore, and the objects 21 of interest may be in trucks that make deliveries to the store. When a trucks leave a distribution center on route to the store, each truck can be listed on the display of the mobile electronic device 15 according to distance from the mobile electronic device 15. Once a truck makes a delivery, the truck can be swiped from the list. Other applications of the displayed item list can equally apply.

The location server 18 is configured to communicate with the shopper device 15, and more specifically, to receive a shopping list electronically stored at the shopper device 15. The location server 18 also uses global satellite positioning (GPS) or the like to determine a current location of the shopper device 15. The location server 18 can receive a location signal, for example, a radio signal, Bluetooth® signal, or the like, directly from the items of interest in the shopping list. Alternatively, the location server 18 can search a database 22 which includes item information. The location server 18 may sort the items of interest on the shopping list according to proximity to the shopper device 15. For example, each item may output a signal having a particular intensity or strength which provides the location of the item. The stronger the signal, the closer the item. The location server 18 can calculate item and user locations either when the user is stationary and the items are in motion, or when the user is in motion and the items are stationary.

Figure 2:
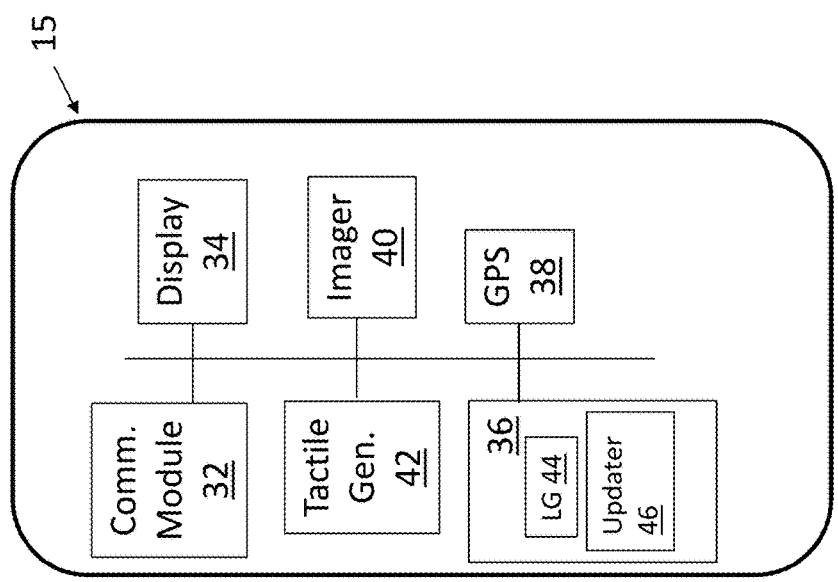
FIG. 2 is a block diagram of a caregiver device, which can be used in embodiments of the present technology.

FIG. 2A is a block diagram of a shopper device 15, which can be used in embodiments of the present technology. FIG. 2B is an illustration of a user interface display of the shopper device 15 of FIG. 2A, in accordance with some embodiments. Although a shopper device 15 is described, other handheld or portable mobile devices may equally apply.

The shopper device 15 can include, but not be limited to, a communication module 32, a display 34, a memory 36, a global positioning system (GPS) 38, an imager or scanner 40, a tactile feedback generator 42, a list generator 44, and an updater 46. The communication module 32 receives data transmitted through the network 16 from the location server 18 and/or directly from items of interest on store shelves or in transit (during movement of the items) and provides the data to the list processor 44. Additionally, the communication module 32 transmits data to the location server 18 such as location information from the GPS 38. In doing so, the communication module 32 can include a transmitter and a receiver, e.g., an antenna, network interface, and so on, for exchanging data in this manner.

The display 34 includes a user interface that permits a user to enter data into the device 15 and to be provided with data by the device 30. In doing so, the display can include at keyboard, touchscreen, speaker, and the like. Non-limiting examples of an imager/scanner 40 include a digital camera or related scanning devices capable of scanning an ID code, for example, a QR code. Collected image data is typically stored in a memory 36. Also stored in the memory 36 are instructions, including operating system software (not shown) and application software such as a list generator 44 which are used to process data for display in accordance with embodiments, for example, described herein.

The list generator 44 receives and processes a list of shopping items input to the user's mobile device 15 by a user, for example, via a keyboard, touchscreen display, and so on. The list generator 44 can organize listed items according to distance from the mobile device 15. In doing so, the list generator 44 associates color, audio, acoustic, or tactile feedback data such as device vibration with the shopping items according to the location of the items relative to the location of the user's mobile device 15, for example, indicative of a distance and/or direction of the mobile device 15 from the items of interest.

The updater 46, like the list generator 44, can be stored in memory 36 and executed by a hardware processor, for example, at the mobile electronic device 15. The updater 46 can reorder the list of items of interest displayed at the display 34 and associate the feedback data with the reordered list of according to current locations of the items of interest relative to the location of the mobile electronic device 15.

Figure 3:
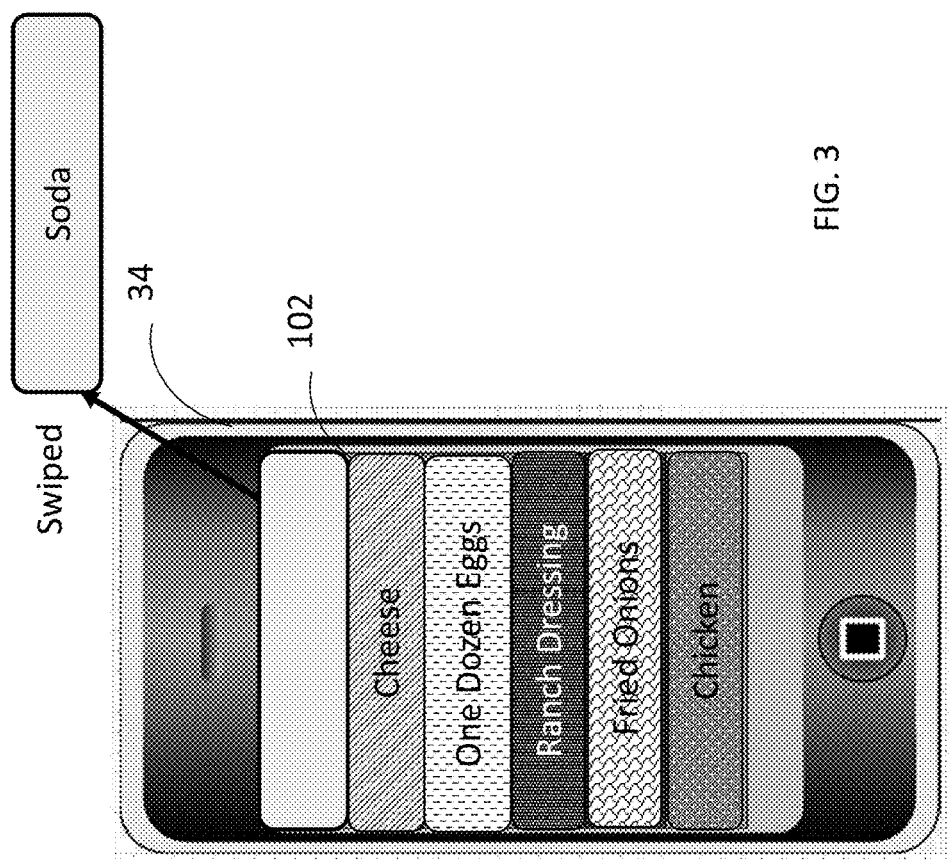
FIG. 3 is an illustration of a user interface display of the shopper device of FIG. 2A, whereby items are removed from the list by swiping them from the screen, in accordance with some embodiments.

FIG. 3 is an illustration of a user interface display 34 of the shopper device of FIG. 2A, whereby items are removed from the list by swiping them from the screen, in accordance with some embodiments.

Displayed at the display 34 is a shopping list of items, for example, store items. These items can be entered by a physical keyboard, touch-sensitive smartphone keyboard, or other related input.

The items can be displayed according to color. In some embodiments, the color of an item on the list depends on the location of the item on the list. For example, items at the top of the list, e.g., Soda, may be displayed in a color (e.g., red), pattern, or the like that distinguishes the items from one another, indicating that soda is the closest item on the list to the mobile device 15. Cheese may be displayed in another, color (e.g., blue, or less red or pink), pattern, or the like, indicating that cheese is the next closest item on the list to the mobile device 15. If Soda is removed from the list, Cheese may appear at the top of the list. The items at or near the top of the list changes colors as the mobile device 15 approaches the items. For example, Cheese may change from blue to red as the user approaches Cheese. The user can swipe or remove a displayed item from the screen. However, the colors associated with the displayed items do not change until the user moves, or otherwise changes the distance between the mobile device 15 and the physical items to which the displayed list corresponds. For example, when Soda is swiped, the color associated with Cheese won't change, for example, to a redder color, until the user walks closer to the cheese at the store. The colors corresponding with each displayed item may change to a different color due to changes in location of the item relative to the display 34.

A user can use the touch-sensitive display 34 to temporarily or permanently dismiss items, for example, by swiping the displayed item. In some embodiments, the closest item may be swiped from the list. In other embodiments, any item on the list may be swiped from the list.

In other embodiments, the device 15 may provide feedback, such as in the form of a shake, thump, bump, vibration, or other physical sensation to the user, or other haptic feedback, and/or a noise, such as by audibly announcing the selection made by the user (e.g., by saying "five" or another number when the user is using a telephone dialer or calculator application). If the announced selection is not what the user intended, the user can "erase" the selection by shaking the portable device in an appropriate manner (where the shaking can be sensed, for example, by an accelerometer in the device). The inclusion of the tactile generation device 42 allows both visible and tactile feedback to be delivered when gesture input is detected.

FIG. 4 is a flowchart of a method 200 for identifying a list of items of interest based on locations of the items, in accordance with some embodiments. In describing the method 200, reference is made to elements of FIGS. 1-4. At least some of the method 200 can be implemented as computer instructions in the memory 36 of the shopper device 15, and executed by list generator 44 and/or updater 46. Other elements of the method 200 can be implemented as computer instructions at other components of the environment 10 of FIG. 1. Method 200 is performed in a shopping environment where the items of interest displayed on the shopping list are stationary, for example, located on shelves in a store, and the mobile device 15 moves relative to the stationary items of interest.

At block 202, a list of items is generated and stored at the shopper device 15. Items of interest may be selected from the list, for example, by identifying the selected items from the list on the display 34. Alternatively, the list of items may be generated, whereby the intent of the list is for the shopper to purchase all items on the list, i.e., no items are selected from the list.

At block 204, the store is identified where the items of interest are located. The device can be located, and a computation may be performed at the list generator 44 or location server 18 to determine the distance from items whose location is stored in a database 22, or to check the relative signal strength from a signal from the items.

At block 206, the locations of the items on the list are determined. In some embodiments, this is achieved by the items each outputting a signal to the location server 18 so that the location server 18 knows where the items are. The location server 18 associates these items to the items on the shopping list by collecting location data of the item, knowing where each item in the store is located, regardless of whether the item is on the list. In other embodiments, items can transmit location info via a Bluetooth® signal or the like which can be listened for by the mobile device 15. The location server 18 is not required here because the list generator 44 can calculate the distance from the item based on a signal strength of a signal coming from the item. Thus, either the location server 18 or the list generator 44 can calculate the distance depending on the configuration.

At block 208, the user location, or more specifically, the shopper device location, is determined using the GPS device 38 at the shopper device 15. In some embodiments, the location server 18 receives a GPS signal from the phone. In other embodiments, a device located proximal an item, for example, at an aisle, can detect the shopping list on the user's phone, or each item can have its own radio frequency identification (RFID) tag or the like. The mobile device 15 can be constructed to have dynamic configuration, where the user's mobile device 15 is tuned into an RFID frequency that the items transmit. The mobile device 15 knows what frequency to dial into to determine which signal is which. A device such as a server or other processing device may provide this information.

At block 210, a distance between the user device 15 and each item on the shopping list is determined. In some embodiments, a distance is determined by accessing the store map. In some embodiments, the mobile device 15 moves about a store or the like relative to stationary items, for example, located along store aisles. In some embodiments, the mobile device 15 is stationary and the items displayed on the list are movable relative to the mobile device 15, for example, located on a transport vehicle, such as an airplane, truck, and so on. The GPS 38 can determine a signal strength of the items being tracked in concert with the location server 18. To track the item movements, each item can generate an RFID signal or the like that is detected by the location server 18. In embodiments where the distance is determined by signal strength of the signal, this can be achieved by tags or the like that are placed on or proximal to the items, which emit an RFID frequency that permits the location server 18 to receive and identify the item.

In some embodiments, the store map displays at the user interface a turn-by-turn display for locating the item of interest. The GPS 38 can determine a path taken by the user, and perform an analysis of the directional paths to the location of the item of interest.

At block 212, a feedback scheme is applied to the displayed list of items according to their distance from the user device 15, for example, performed by the list generator 44. One or more of color coding scheme, tactile feedback and list ordering may occur with the primary factor being the distance from the stationary user to the items he is interested in. In one embodiment, in a color coding scheme, each item can have a corresponding color indicating a distance from the mobile device 15. For example, a first color, e.g., red, is used for items that are close and a second color, e.g., blue, is used for items that are far away. In another example, items are shades of one color, for example, redder, toward the top of the list indicating closer distances and shades of another color, for example, bluer, towards the bottom indicating farther distances. In another example, the feedback scheme may be a tactile scheme, where the device produces a different audio or tactile for each item on the list depending on its location.

In embodiments where a turn-by-turn display is provided, the top of the list can include an arrow or other indicator that points to the direction of the item. This arrow or indicator can change as the user moves with the mobile device 15 toward the displayed item of interest. The feedback scheme is applied to a reordered list as items are removed and/or added to the list.

Once the mobile device user is no longer interested in an item of interest, for example, because the user is at the item where the distance is at or near zero, the user may remove or dismiss the item from the display 34 of the mobile device 15, for example, by a swiping motion to dismiss the item from the user interface. The distance to the relevant items are recalculated (return to block 210) to keep the display 34 as up to date as possible. This may occur at a frequency specified by a configuration parameter at the location server 18, which may be user-defined.

As will be appreciated by one skilled in the art, concepts may be embodied as a device, system, method, or computer program product. Accordingly, aspects may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Computer program code for carrying out operations for the concepts may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Concepts are described herein with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While concepts have been shown and described with reference to specific preferred embodiments, it should be understood by those skilled in the art that various changes in form and detail may be made therein without departing from the spirit and scope as defined by the following claims.

What is claimed is:

1. A system for displaying an item list, comprising:
a list generator on a device that associates a list of items of interest at a retail establishment with feedback data according to locations of the items of interest relative to a location of the device;
a location server that determines the locations of the items of interest relative to the location of the device by detecting signals emitted from the items of interest; and
an updater that reorders the list of items of interest and associates the feedback data with the reordered list of according to current locations of the items of interest relative to the location of the device, wherein when the device is at a closest item of interest having a predetermined feedback data, the closest item of interest is swiped or removed from the list of items of interest displayed at a user interface of the device, and the list of items of interest is reordered so that the next closest item of interest has the predetermined feedback data, wherein the feedback data includes a color scheme that is displayed to indicate a current distance between the device and the items of interest, wherein the color scheme includes a first color that is displayed to identify the closest item of interest when the device is at a first distance from the closest item of interest and a second color that is displayed to identify a next closest item of interest when the device is at a second distance from the next closest item of interest, and wherein in response to the closest item of interest being swiped or removed from the list of items of interest displayed at the user interface, the distances between the device and the items of interest are recalculated and the color scheme changes so that the first color is displayed to identify the next closest of item of interest and the second color is displayed to identify a different item of interest.

2. The system of claim 1, wherein the distance between the device and the items of interest is determined by a combination of a global positioning satellite (GPS) device on the device and a radio frequency identification (RFID) signal received from the items of interest.

3. The system of claim 1, wherein each item of interest is identified among the list of items based on a distance of the device from the items of interest, wherein the user interface displays a particular item of interest based on the particular item of interest being the closest to the device among the list of items of interest.

4. The system of claim 1, wherein the feedback data includes at least one of color, audio, acoustic, or tactile feedback data.

5. The system of claim 1, wherein the device is stationary and the items of interest are in motion relative to the device.

6. The system of claim 1, wherein the items of interest are stationary and the device is in motion relative to the items of interest.

7. A system for displaying a list of items of interest, comprising:
- a location server that determines at least one of a distance and a direction from the items of interest by detecting signals emitted from the items of interest: and
- an updater at a mobile shopper device that applies a feedback scheme to display a shopping list that lists the items of interest according to the distance between the mobile shopper device and the items of interest wherein the feedback scheme is displayed to indicate a current distance between the mobile shopper device and the items of interest and includes a first color that is displayed to identify the closest item of interest when the mobile shopper device is at a first distance from the closest item of interest and a second color that is displayed to identify a next closest item of interest when the mobile shopper device is at a second distance from the next closest item of interest and wherein in response to the closest item of interest being swiped or removed from the list of items of interest displayed at a user interface of the mobile shopper device, the distances between the mobile shopper device and the items of interest are recalculated and the color scheme changes so that the first color is displayed to identify the next closest of item of interest and the second color is displayed to identify a different item of interest.

8. The system of claim 7, wherein the feedback scheme includes at least one of color, audio, acoustic, or tactile feedback data.

9. The system of claim 7, further comprising a list generator that associates the feedback scheme with the items of interest according to a location of the items relative to the location of the mobile shopper device.

10. The system of claim 7, wherein the device is stationary and the items of interest are in motion relative to the device.

11. The system of claim 7, wherein the items of interest are stationary and the device is in motion relative to the items of interest.

12. A method for displaying a list of items of interest, comprising:
- generating a shopping list that includes the items of interest at a store;
- determining a distance between a device displaying the shopping list and the items of interest by a location server detecting signals emitted from the items of interest:
- applying a feedback scheme to the displayed shopping list according to the distance between the device displaying the shopping list and the items of interest, wherein the feedback scheme is displayed to indicate a current distance between the device and the items of interest wherein the color scheme includes a first color that is displayed to identify the closest item of interest when the device is at a first distance from the closest item of interest, and a second color that is displayed to identify a next closest item of interest when the device is at a second distance from the next closest item of interest and wherein in response to the closest item of interest being swiped or removed from the list of items of interest displayed at the user interface, the distances between the device and the items of interest are recalculated and the color scheme changes so that the first color is displayed to identify the next closest of item of interest and the second color is displayed to identify a different item of interest.

* * * * *